June 24, 1958  E. M. MOERDYK  2,840,162
WINDOW SCREEN
Filed April 6, 1956  2 Sheets-Sheet 1
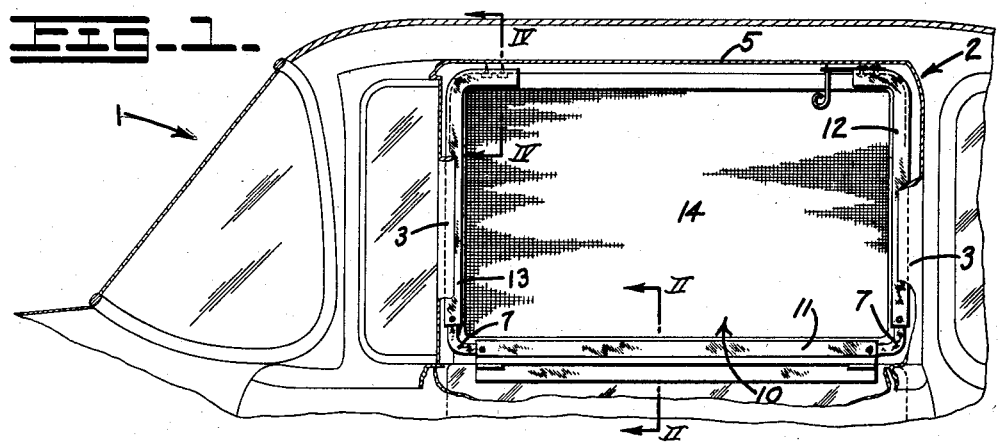
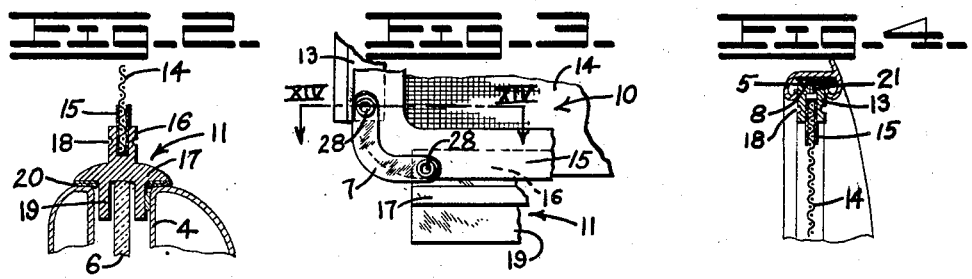
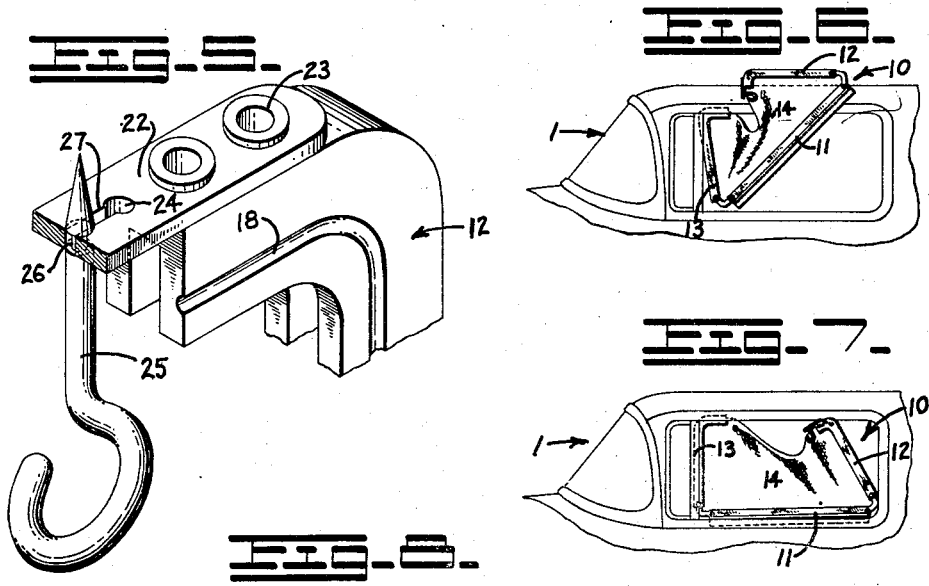
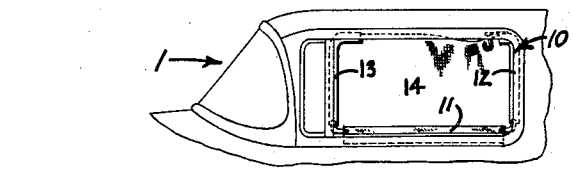
INVENTOR
Earl M. Moerdyk
BY
Price and Heneveld
ATTORNEYS June 24, 1958 E. M. MOERDYK 2,840,162
WINDOW SCREEN
Filed April 6, 1956 2 Sheets-Sheet 2
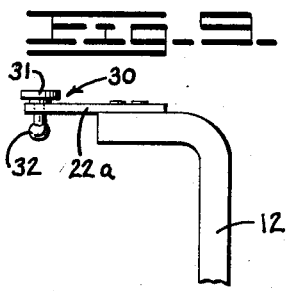
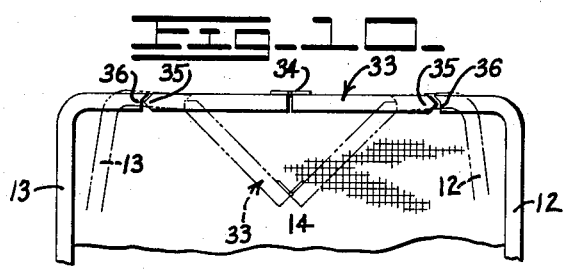
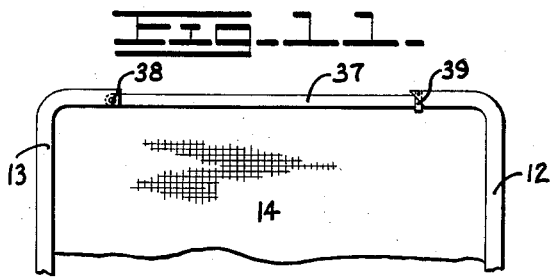
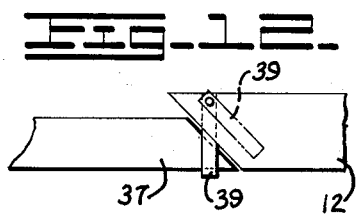
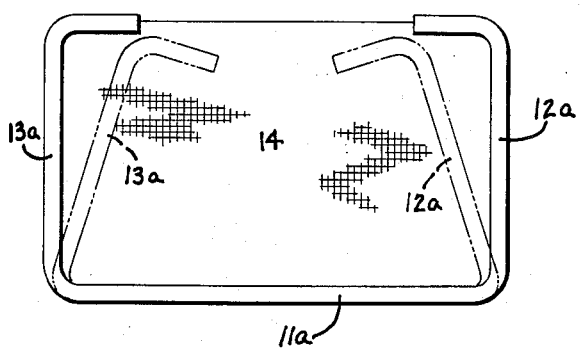
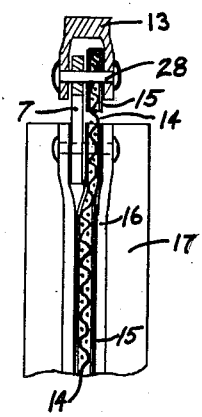
INVENTOR
Earl M. Moerdyk
BY
Price and Heneveld
ATTORNEYS

United States Patent Office 2,840,162
Patented June 24, 1958

2,840,162

WINDOW SCREEN

Earl M. Moerdyk, Grand Rapids, Mich.

Application April 6, 1956, Serial No. 576,608

2 Claims. (Cl. 160—377)

This invention relates to a window screen and more particularly to a removable window screen for motor vehicles.

Although various types of window screens for motor vehicles have been devised, heretofore very few of these window screens have met with commercial success. One of the reasons is because the structure of such screens requires cutting into the frame or garnish molding of the automobile making the screen difficult to install and also adversely affecting the appearance of the vehicle.

With the advent of outdoor theatres and other drive-in functions, a need for a compact but easily installed window screen for motor vehicles has been created. To my knowledge no suitable type window screen has been developed.

An object of this invention is to provide a window screen for a motor vehicle, such a window screen being easily installed and adapted for folding into a compact package.

Another object of this invention is to provide a window screen which when installed in the car does not detract from the appearance of the vehicle.

Still another object of this invention is to provide a foldable window screen which can be easily installed in the channels, along the sides, tops and bottoms of a motor vehicle window.

A further object of this invention is to provide a window screen for a motor vehicle, such window screen being of simple construction whereby it can be easily manufactured.

Still a further object of this invention is to provide an automobile window screen which when installed is dependably retained in such position and when desired, can easily and quickly be removed, folded, and stored in a convenient package or other storage facility.

Other objects of this invention will become obvious upon reading the following specification in conjunction with the accompanied drawings wherein:

Fig. 1 is a fragmentary, side elevational view of a motor vehicle with the screen installed.

Fig. 2 is a fragmentary, cross sectional view taken along the plane II—II of Fig. 1.

Fig. 3 is a fragmentary, partially cut away view of a portion of the screen illustrating the pivotal connection of the support members.

Fig. 4 is a fragmentary, sectional view taken along the plane IV—IV of Fig. 1.

Fig. 5 is a fragmentary, oblique view of the retaining pin arrangement for holding the screen supports in place.

Figs. 6, 7 and 8 illustrate the preferred method of installing the screen, thus each figure shows the screen in a different progressive position of installation.

Fig. 9 is a fragmentary, elevational view of a modified means for anchoring a screen support.

Fig. 10 is a fragmentary, elevational view of a modified arrangement for locking the supports in the channels of the vehicle window.

Fig. 11 is a fragmentary, elevational view of still another arrangement for locking the supports in the window channels.

Fig. 12 is an enlarged, fragmentary portion of the locking means in Fig. 11.

Fig. 13 is an elevational view of modified screen having another arrangement for supporting the window screen.

Fig. 14 is an enlarged, fragmentary view of the pivotal connection between the supports as taken along the plane XIV—XIV of Fig. 3.

Briefly this invention is concerned with a window screen for a motor vehicle. The screen of this invention has a first vertical support and a second vertical support, each operatively connected to a horizontal support. The vertical supports are adapted to seat in the side channels of the motor vehicle window. A means is provided for securing the vertical supports in the channels whereby when installed, the screen is held taut across the window opening.

Referring to the drawings, Figs. 1 through 8 illustrate the preferred embodiment of this invention. Reference numeral 1 denotes the motor vehicle body which includes the side door window 2 of the conventional type which winds down to open the window and winds up to close it. This type window has the side channels 3 in which the window rides in being actuated up or down. It also has the lower receiving channel 4 (Fig. 2) and the upper channel 5. When the window 6 is lowered it is received by the channel 4 (Fig. 2). When it is raised it rides in the channels 3 and finally enters into the channel 5. The channels 3 and 5 are of substantially the same width while channel 4 is slightly larger. In accordance with this invention I provide a screen unit 10 adapted to be installed in channels 3, 4 and 5.

The screen 10 includes the horizontal support member or rail 11 and the upright support members or rails 12 and 13. The rails support the screen 14 and when installed hold it taut across the window opening. The two upright rails 12 and 13 are pivotally secured at their lower ends to the ends of the horizontal support member 11 by hinges 7.

The horizontal support member 11 includes an elongated extruded aluminum bar having the cross section shown in Fig. 2. It thus includes a neck 16 extending upwardly from the shoulders 17. The neck 16 has a slot or recess for receiving the screen. It clinches the lower edge or hem 15 of the screen 14 formed by plastic tape folded equally along each side of the edges. The tape and the screen is clinched in the recessed neck 16 by rolling a groove 18 on each side of the neck. The shoulders 17 are of sufficient width to span channel 4 and rest on the top edge thereof. A pair of legs 19 extend downwardly from shoulder 17 and are spaced one from each other to form a recess for receiving the window 6. Thus, when installed the shoulders 17 rest on the top edges of the channel 4 and the legs 19 extend downwardly on each side of the window 6 between the sides of the window and the channel. In order to prevent any scratching of the garnish molding felt strips 20 are provided on the bottom surfaces of the shoulders 17.

The upright support members or rails 12 are formed of an extruded aluminum stock having a U-shaped cross section (Figs. 4 and 14). The channels of the support members 12 receive the taped edge or hem 15 in the same manner previously described in relation to Fig. 2. The two support members 12 and 13 are substantially identical. Both of them are bent inwardly at their top ends to conform with the shape of the window. At their lower ends they are pivotally secured to the base rail 11 by the hinge members 7 as will be explained in more detail hereinafter. The side support rail 13 in the modification shown on Fig. 1 is secured in channel 5 by the stay pins 21 (Fig. 4) which are held in the rail 13 because of the clinching effect previously described.

The rail 12 is secured in the channel 5 by the releasable pin retaining means detailed in Fig. 5. This retaining means includes the flat spring member 22 and pin 25. The spring 22 is secured to the bent end of the support member 12 by rivets 23. It is sufficiently resilient so that when pulled downwardly and released it will spring upwardly and cause the sharp end of pin 25 to pierce the felt runner pad 8. This holds the rail 12 in the channels 3 and 5.

The pin 25 is preferably secured to plate 22 by drilling a hole 24 in the spring plate 22 and providing a key slot 27 adjoining it. The pin 25 is provided with a reduced diameter portion 26 which, when the sharp end of the pin is inserted into the hole 24, is slid into the slot 27. The pin is locked in this position by clinching or any suitable means.

Location of retaining pins may be attached to either right or left vertical rail, which may be more desirable or convenient to effect installation on specific model of vehicle.

At their lower ends, the rails 12 and 13 are pivotally secured to the horizontal rail 11 by the hinges 7. The hinges 7 each extend into and are pivotally connected in the recesses or channels of the rails 11, 12 and 13 by the rivets 28 (Figs. 3 and 14). The recesses or channels at these ends are slightly wider in order to receive both the hinge 7 and the taped edge 15 of the screen (Fig. 14). This is made possible by terminating the rolled groove 18 short of the ends. The hinge connection made possible by the hinges 7 permits the two upright support rails 12 and 13 to be pivoted downwardly into a position where the entire unit can be rolled into a very small package. This pivotal connection also facilitates easy installation of the unit.

The materials from which the component parts of this invention are made include the meshed plastic screen cut to appropriate size and having the plastic tape hem along the edges. Cello-tape or any similar binding material can be used in lieu of the plastic tape. The upright and horizontal rails are preferably constructed of extruded aluminum. This can be dyed aluminum to match the color of the automobile in which it is to be used. The rivets are preferably of the same material as the rails in order to prevent any discoloration due to rusting or otherwise. It should be understood that any suitable material can be used.

Operation

The operation of this window screen unit is simple. It is illustrated by Figs. 6, 7 and 8. The entire unit, as previously described, can be folded into a very compact package and easily carried with the motor vehicle. When use is desired, the upright rail 13 is first inserted in the side channel 13. This is accomplished by first inserting the channel in the left upper corner of the window channel as illustrated in Fig. 6. In this step the stay pins 21 are made to pierce the felt pad 8 in the channel 5. Then the lower end is swung downwardly into the side channel 3. Next, the basic horizontal rail member 11 is made to seat in the channel 4 with the legs 19 on each side of the window 5 and the shoulders 17 resting on the top edges. The felt pad prevents any scratching of the garnish molding or other finished surface.

Having installed the upright rail 13 and the horizontal rail 11, as illustrated in Fig. 7, the rail 12 is pivoted into the side channel 3. The operator pulls down on the handle of the pin 25 to prevent the pin from sticking into the felt pad 8 until the entire rail is in position. When entirely installed the pin 25 is released resulting in the spring plate 22 biasing it upwardly and causing the pointed end to pierce the felt pad 8 thus retaining the unit in the window.

In this installed position the screen 14 is held taut across the window opening. The rails are substantially hidden out of sight in the channels 3, 4 and 5 thus preventing any detraction from the appearance of the vehicle. The portions of the rails which are exposed are of pleasant appearance and do not detract from the appearance of the vehicle.

When the use of the screen is no longer desired, the screen is easily removed by pulling down on the retaining pin 25, thus, releasing the sharp end from the felt pad 6. The rail 12 is then pivoted downwardly out of the channel 3 after which the rail 11 can be pulled out of the channel 4 and the rail 13 out of the channel 3.

It will be seen that the installation and removal of the window screen unit is very simple and does not mar or scratch the finished surfaces of the vehicle. Nor does this screen detract from the appearance of the vehicle.

Modifications

Fig. 9 illustrates a modified arrangement of the retaining pin for anchoring the rail 12 in the channel 3. In this particular modification a friction type retaining member 30 is substituted for the pin 25 of Fig. 5. The retaining member 30 consists of a cap 31 made of material having high friction qualities such as rubber. The cap 31 is shaped to fit into the top channel 5 of the window and engage the walls of channel 5 for holding the rail 12 firmly in the channel 3. The member 30 is mounted on the end of the resilient plate 22a in a similar manner to that previously described. A handle 32 is attached to the other end of member 30. By pulling downward on handle 32, the plate 22a is adapted to be flexed for installing the screen. When once installed, the plate 22a forces the cap 31 into the channel holding and retaining the rail 12 in the channels 3 and 5.

Fig. 10 shows a modified arrangement for locking the two upright rails 12 and 13 in the channels 3. With this particular arrangement, the stay pins 21 and pin 25, previously described, are entirely eliminated. According to this modification a hinged retaining bar 33 locks the rails in position. The bar 33 is hinged at the center by hinge 34. It has pointed ends 35 which are received by corresponding V-shaped grooves 36 in the bent top ends of the rails 12 and 13. The installation of the screen is made by first seating the rail 11 in the channel 4. Then the two rails 12 and 13 are pivoted upwardly into the channels 3. Next the pointed ends 35 are inserted in the V-grooves 36 and the bar is straightened. This pushes the rails upwardly into the position shown by the full lines of Fig. 10. The bar 33 and hinge 34 are arranged so that when the bar is straightened to the installed position it is pivoted slightly over center. Forces on the pointed ends thus tend to break the knee at hinge 34 upwardly into the channel rather than downwardly.

Figs. 11 and 12 show still another modification. In this modification, a rod 37 is pivotally secured to the rail 13 by a rivet 38. When installed, the rod is pivoted upwardly against the end of rail 12 where it is held in place by a latch 39 (Fig. 12). The screen of this modification is installed by first inserting the rail 11 in the channel 4 and then pivoting the two upright rails 12 and 13 into the channels 3. Then the rod 37 is pivoted up into position against the rail 12 and is locked by the latch 39.

Fig. 13 shows still another modification where the horizontal upright rails are all integral with each other. The horizontal rail 11a seats in the lower channel 4 and the two upright rails 12a and 13a seat in channels 3 and 5 as previously described. The material from which the rails 11a, 12a and 13a is fabricated is resilient so as to permit relative movement between the upright rails 12a and 13a and horizontal rail 11a. This movement is on the plane of the screen. This structure permits two rails 13a and 12a to be folded downwardly into a small package. It also permits the rails to be installed by progressively inserting the rails in the channel. For example, one method of installing the modified screen of Fig. 13 is to first compress the two rails 12a and 13a together as shown in phantom. Then the rail 11a is seated in the lower channel 4. The two rails 12a and 13a are swung into the plane of the window and then released causing them to seat into the channels 3. The rails 11a, 12a and 13a can be made of any suitable material which has sufficient resiliency to accomplish the above result.

Another possible modification, not illustrated, can consist of a spring wire bent 90° at its extreme ends. In such modification the top bent ends of the side rails have a hole adapted to receive the ends of the spring wire. The installation is similar to the modification of Fig. 10. After installing the rail 11 the two upright side rails are pivoted into the side channels. Then the ends of the spring wire are inserted in the holes in the side rails. Due to its inherent resilient strength the spring wire tends to bias the rails into the channels.

It should be evident that I have invented a novel type screen for a motor vehicle, such screen being adapted to be installed in the channels of any conventional vehicle window. This unit in all the modifications is adapted to be folded up into a small package which can be carried until use is desired. Then it can be easily installed in the window without injuring or marring the finished surfaces of the garnish molding and other parts of the vehicle. It can be easily removed and stored.

It should be understood that although I have shown various modifications of my invention, other modifications are possible within the broadest aspect of this invention. Therefore, unless expressly stated otherwise in the appended claims, my invention shall not be limited to all the details shown and described.

I claim:

1. A window screen unit for a window opening having top, bottom and side channels, comprising: first and second rigid, vertical support members arranged substantially parallel to each other; a horizontal support member located between two adjacent ends of said first and second support members; said support members having channels along their inner edges; pivotal connecting elements extending into and freely pivotally secured in said channels between the ends of said horizontal support members and the adjacent ends of said first and second support members; and a screen extending between said vertical support members and into the channels thereof and of said horizontal support member; the sides of said channels, except for the end portions in which said pivotal connecting members are pivotally secured, being pinched together in grasping relationship with the marginal edges of said screen; and a separate elongated, locking element extending between the ends of said vertical members, opposite said adjacent ends, for holding said screen unit in extended position, said locking element being removable whereby the two vertical members can be pivoted about said pivotal connecting elements into collapsed position against said horizontal support member.

2. A window screen unit for a window opening having top, bottom, and side channels, comprising: first and second rigid, vertical support members arranged substantially parallel to each other; a horizontal support member located between two adjacent ends of said first and second support members; said support members having channels along their inner edges; pivotal connecting elements extending into and freely pivotally secured in said channels between the ends of said horizontal support members and the adjacent ends of said first and second support members; and a screen extending between said vertical support members and into the channels thereof and of said horizontal support member; the sides of said channels, except for the end portions in which said pivotal connecting members are pivotally secured, being pinched together in grasping relationship with the marginal edges of said screen; and locking means on the ends of said vertical members opposite said adjacent ends, for holding said screen unit in extended position, said locking means being detachable whereby the two vertical members can be pivoted about said pivotal connecting elements into collapsed position against said horizontal support member.

References Cited in the file of this patent

UNITED STATES PATENTS 2,702,596    Morrow  ----------- Feb. 22, 1955